(12) United States Patent
Lee et al.

(10) Patent No.: US 11,332,082 B1
(45) Date of Patent: May 17, 2022

(54) VEHICLE TRIM PANEL ASSEMBLY

(71) Applicant: Ford Global Technologies, LLC, Dearborn, MI (US)

(72) Inventors: Juyoung Lee, West Bloomfield, MI (US); Marwan Ahmad Elbkaily, Canton, MI (US); Gururaj Aralikatti, Farmington, MI (US); George David Aucott, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/113,155

(22) Filed: Dec. 7, 2020

(51) Int. Cl.
*B60R 13/02* (2006.01)
*B60R 21/04* (2006.01)
*B60N 3/02* (2006.01)

(52) U.S. Cl.
CPC ............ *B60R 13/025* (2013.01); *B60N 3/026* (2013.01); *B60R 21/04* (2013.01); *B60R 2021/0435* (2013.01)

(58) Field of Classification Search
CPC .................. B60R 13/025; B60R 21/04; B60R 2021/0414; B60R 2021/0421; B60R 2021/0435; B06N 3/026; B60N 3/02
USPC ........................................... 296/1.02, 187.05
See application file for complete search history.

(56) References Cited

U.S. PATENT DOCUMENTS

| | | | |
|---|---|---|---|
| 4,106,810 A | 8/1978 | Barecki | |
| 5,593,182 A | 1/1997 | Frost | |
| 5,709,407 A * | 1/1998 | Stephens | B60R 13/025 280/751 |
| 5,709,507 A | 1/1998 | Stephens et al. | |
| 5,779,270 A * | 7/1998 | Tanaka | B60R 22/24 280/808 |
| 6,126,230 A | 10/2000 | Ikeda et al. | |
| 6,647,594 B1 | 11/2003 | Deb et al. | |
| 6,668,424 B1 * | 12/2003 | Allen | B60N 3/026 16/436 |
| 7,407,209 B2 | 8/2008 | Stolarczyk et al. | |
| 7,631,915 B2 | 12/2009 | Browne et al. | |
| 7,905,530 B2 | 3/2011 | Browne et al. | |
| 8,465,065 B2 | 6/2013 | Browne et al. | |
| 8,636,313 B2 * | 1/2014 | Huelke | B60N 3/026 296/1.02 |
| 8,672,381 B1 * | 3/2014 | Bauer | B60N 3/02 296/1.02 |
| 2002/0079684 A1 * | 6/2002 | Prottengeier | B60R 21/04 280/751 |
| 2002/0116791 A1 * | 8/2002 | Grady | B60N 3/02 16/444 |
| 2004/0076014 A1 * | 4/2004 | Bach | B60N 3/026 362/501 |
| 2007/0267884 A1 | 11/2007 | Failla et al. | |
| 2008/0001384 A1 * | 1/2008 | Catron | B60R 21/213 280/730.2 |
| 2008/0111395 A1 * | 5/2008 | Longwell | B60R 21/213 296/187.05 |

(Continued)

*Primary Examiner* — Jason S Morrow
(74) *Attorney, Agent, or Firm* — Frank A. MacKenzie; Bejin Bieneman PLC

(57) ABSTRACT

A vehicle trim panel assembly includes a pillar trim panel, a grab handle extending from the pillar trim panel defining a corner between the pillar trim panel and the grab handle, and a ramp at the corner. The ramp is fixed relative to the pillar trim panel and the grab handle at the corner. The ramp is deformable relative to the grab handle.

20 Claims, 10 Drawing Sheets

(56) References Cited

U.S. PATENT DOCUMENTS

| | | | |
|---|---|---|---|
| 2011/0175386 A1* | 7/2011 | Akaba | B60R 13/0206 296/1.02 |
| 2011/0221172 A1* | 9/2011 | She | B60R 13/0206 280/730.2 |
| 2011/0221236 A1* | 9/2011 | She | B60R 13/025 296/191 |
| 2014/0159351 A1* | 6/2014 | Masatsugu | B60N 3/026 280/728.2 |
| 2020/0156584 A1* | 5/2020 | Akagi | B60R 13/025 |
| 2021/0061469 A1* | 3/2021 | Jolley | B60Q 3/41 |

\* cited by examiner

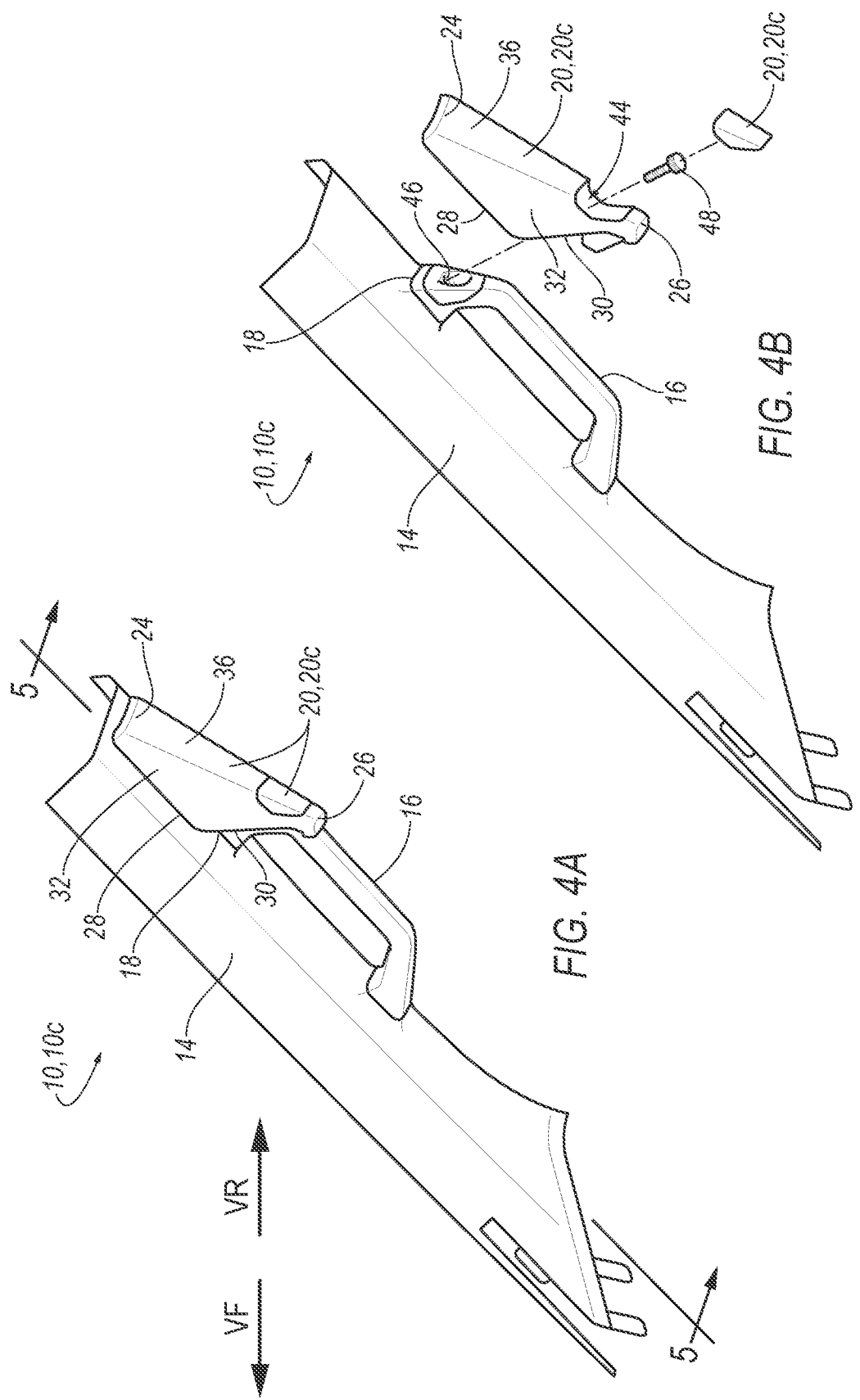

VEHICLE TRIM PANEL ASSEMBLY

BACKGROUND

Automobiles are subject to a variety of crash tests, including standard tests regulated by the National Highway Traffic Safety Administration (NHTSA). For example, these tests may be directed toward oblique impacts, i.e., impacts that occur at an angle of 10-50 degrees relative to a vehicle's trajectory. During the oblique impact, occupants of the vehicle move forward and laterally. As one example of an oblique impact test, a moving cart with a deformable barrier moves at 56 mph and impacts a stationary vehicle at a 15 degree angle with a 35% overlap. As another example, the vehicle can be subject to a frontal angular crash test that satisfies the criteria for the Federal Motor Vehicle Safety Standards (FMVSS) 208 § 5.1 evaluation.

Several types of information are measured during the crash test, including airbag performance, test dummy reaction, etc. One type of measurement is the Head Injury Criteria (HIC) during the oblique impact.

BRIEF DESCRIPTION OF THE DRAWINGS

FIG. 4A is a perspective view of a third embodiment of the trim panel assembly.

FIG. 4B is an exploded view of the third embodiment of the trim panel assembly.

DETAILED DESCRIPTION

Figure 1:
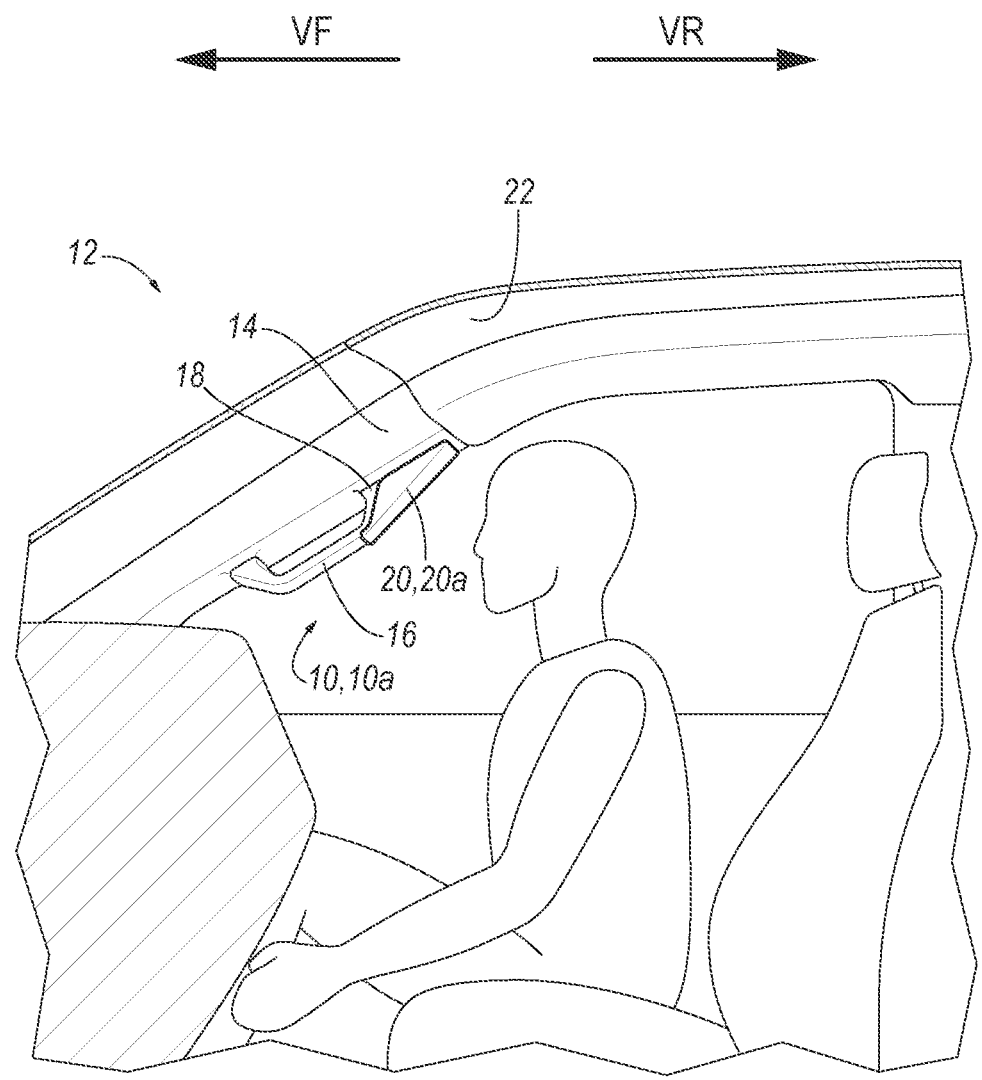
FIG. 1 is a side view of a vehicle with a trim panel assembly.

A vehicle trim panel assembly includes a pillar trim panel, a grab handle extending from the pillar trim panel defining a corner between the pillar trim panel and the grab handle, and a ramp at the corner. The ramp is fixed relative to the pillar trim panel and the grab handle at the corner. The ramp is deformable relative to the grab handle.

The ramp may include a cavity facing the pillar trim panel and the grab handle.

The ramp may include ribs in the cavity.

The vehicle trim panel assembly may further include a filler block in the cavity. The filler block may be a different material type than the material type of the ramp.

The filler block may be foam.

The ramp may be plastic.

The cavity may be enclosed by the ramp, the pillar trim panel, and the grab handle.

The ramp may include an inner surface facing the trim panel and the grab handle and an outer surface facing an opposite direction than the inner surface. The ramp may include an external rib on the outer surface.

The ramp may include a first end at the trim panel and a second end at the handle. The external rib may be elongated in a direction from the first end to the second end.

The outer surface and the external rib may be class-A surfaces.

The grab handle may include a hole. The ramp may include a hole aligned with the hole of the grab handle. A fastener may extend through the hole in the ramp and the hole in the grab handle, connecting the ramp to the grab handle.

The ramp may include a cavity facing the pillar trim panel and the grab handle. The hole of the ramp may be between the cavity and the grab handle.

The ramp may include ribs in the cavity.

The vehicle trim panel assembly may further include a filler block in the cavity. The filler block may be a different material type than the material type of the ramp.

The ramp may include a first end at the trim panel and a second end at the grab handle. The first end of the ramp may be above the handle.

The first end of the ramp may be vehicle-rearward of the second end.

The grab handle may include a hole. The ramp may include a hole at the first end of the ramp. A fastener may extend through the hole in the ramp and the hole in the grab handle, connecting the ramp to the grab handle.

The vehicle trim panel assembly may further include a fastener connecting the ramp to the grab handle.

With reference to the Figures, where like parts are identified with like numerals, a vehicle trim panel assembly 10 (hereinafter "trim panel assembly 10") in a vehicle 12 includes a pillar trim panel 14, a grab handle 16 extending from the pillar trim panel 14 and defining a corner 18 between the pillar trim panel 14 and the grab handle 16, and a ramp 20 at the corner 18. The ramp 20 is fixed relative to the pillar trim panel 14 and the grab handle 16 at the corner 18. The ramp 20 is deformable relative to the grab handle 16.

The vehicle 12 includes the pillar trim panel 14 to cover portions of a vehicle pillar 22. The grab handle 16 extends from the pillar trim panel 14 to support the occupant during ingress and egress of the vehicle 12. During a vehicle impact that urges an occupant toward the grab handle 16, e.g., an oblique impact, the ramp 20 deflects the occupant away from the grab handle 16 and/or absorbs energy from the occupant moving toward the grab handle 16 and the vehicle trim pillar 14. Specifically, the ramp 20 occupies the corner 18 to change the angle of impact between the occupant, e.g., the head of the occupant, and the pillar trim panel 14 and grab handle 16. The ramp 20 may deflect the occupant to decrease the energy transfer from the occupant to the pillar trim panel 14 and/or the grab handle 16. Since the ramp 20 is deformable relative to the grab handle 16, the ramp 20 absorbs energy from the occupant in the event the occupant impacts the ramp 20. The deflection of the head of the occupant by the ramp 20 and/or the absorption of energy by the ramp 20 during impact by the head of the occupant reduces movement of the occupant's head toward the pillar trim panel 14 and the grab handle 16 which may reduce HIC15 values.

Figure 2A:
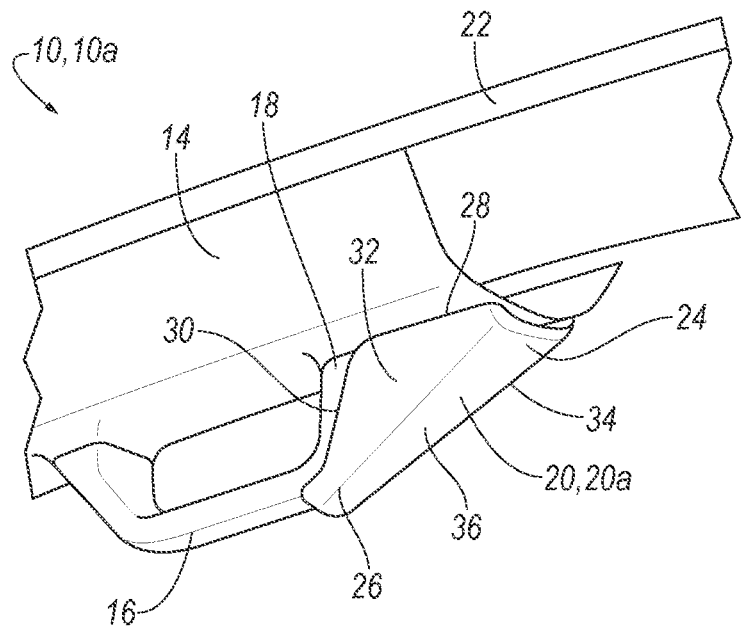
FIG. 2A is a perspective view of the trim panel assembly.
Figure 2B:
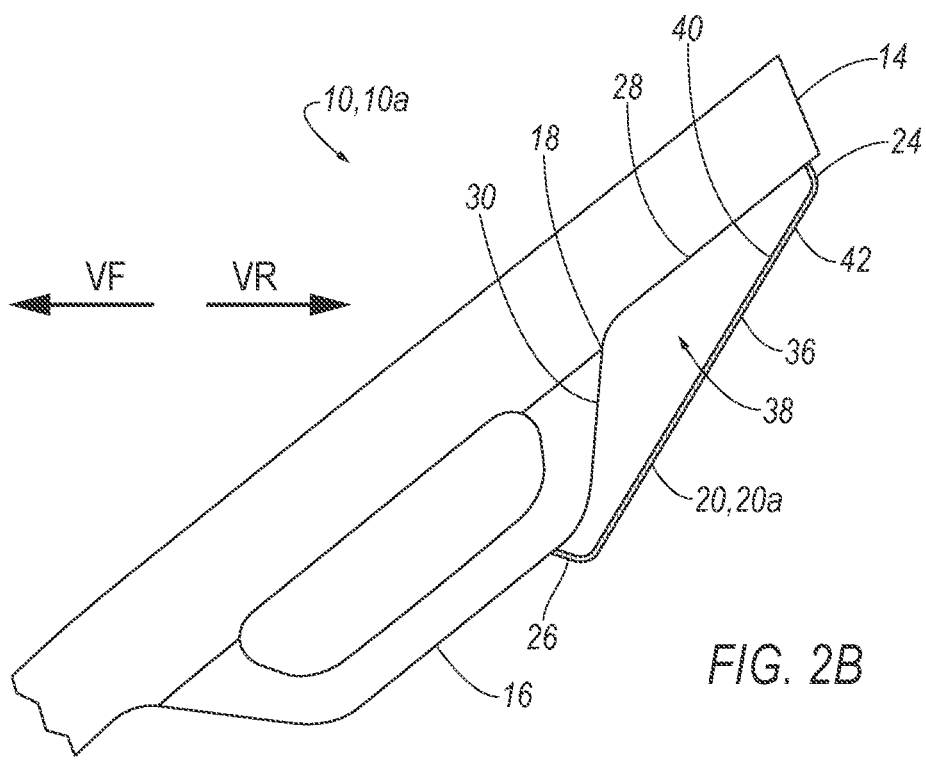
FIG. 2B is a cross-sectional view of a ramp of the trim panel assembly.
Figure 9A:
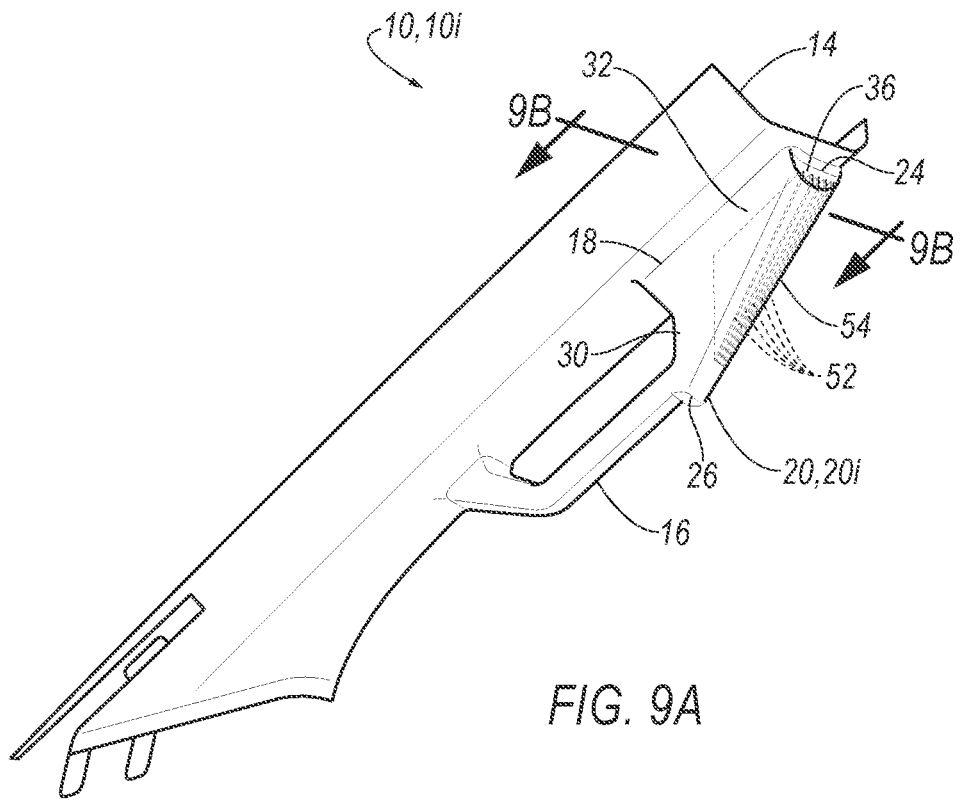
FIG. 9A is a perspective view of a ninth embodiment of the trim panel assembly.
Figure 9B:
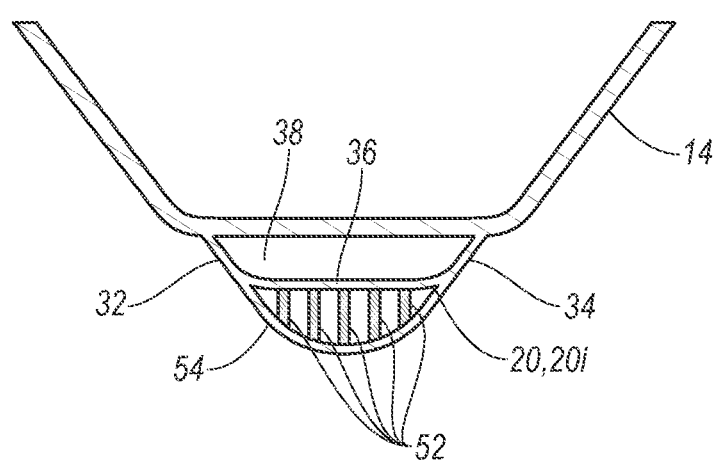
FIG. 9B is a cross-sectional view of the ninth embodiment of the trim panel assembly.

FIGS. 1-9B illustrate nine embodiments 10a, 10b, 10c, 10d, 10e, 10f, 10g, 10h, 10i of the trim panel assembly, collectively, the "trim panel assembly 10." That is, the numeral 10 refers to features common to all embodiments of the trim panel assembly 10, and features specific to each embodiment 10a-10i will use the respective alphanumeric designation. FIGS. 1-2B illustrate the trim panel assembly 10a. FIGS. 3A-3B illustrate the trim panel assembly 10b. FIGS. 4A-5A illustrate the trim panel assembly 10c. FIG. 5B illustrates the trim panel assembly 10d. FIG. 5C illustrates the trim panel assembly 10e. FIGS. 6A-6B illustrate the trim panel assembly 10f. FIGS. 7A-7B illustrate the trim panel assembly 10g. FIGS. 8A-8B illustrate the trim panel assembly 10h. FIGS. 9A-9B illustrate the trim panel assembly 10i.

The vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous. In other words, the vehicle 12 may be autonomously operated such that the vehicle 12 may be driven without constant attention from a driver, i.e., the vehicle 12 may be self-driving without human input. The vehicle 12 defines a vehicle-forward direction VF along a direction of forward motion of the vehicle 12 and a vehicle-rearward direction VR opposite the vehicle-forward direction VF, as shown in FIGS. 1, 2B, 3B, 4A, and 5A-5C.

Figure 3A:
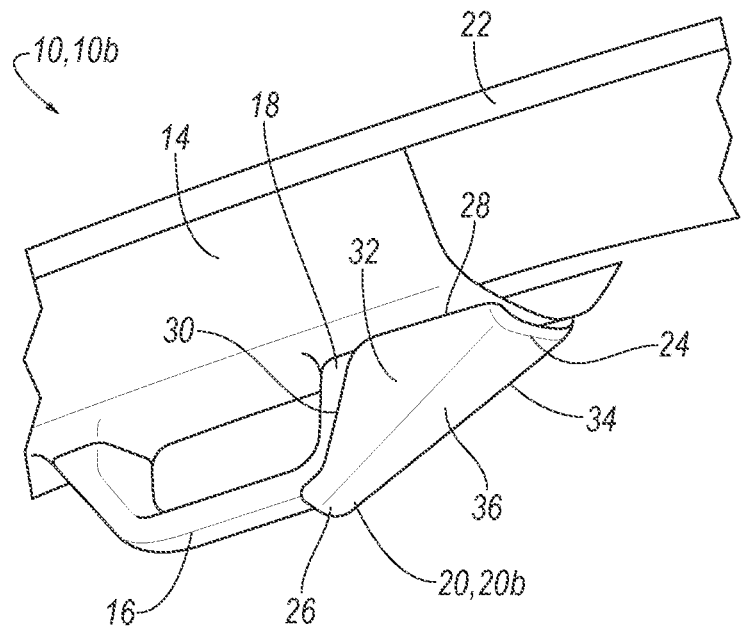
FIG. 3A is a perspective view of a second embodiment of the trim panel assembly.

The vehicle 12 includes a body. The body includes body panels partially defining an exterior of the vehicle 12. The body panels may present a class-A surface, e.g., a finished surface exposed to view by a customer and free of unaesthetic blemishes and defects. The body panels include, e.g., a roof, etc. The body may include pillars 22. For example, the body may include an A-pillar and a B-pillar on each side of the vehicle 12. The A-pillars may extend between the windshield and a front door. In other words, the A-pillars may be disposed at the front end of the passenger cabin. The B-pillars may extend behind the front doors, e.g., between adjacent doors. In other words, the B-pillars may be spaced from the A-pillars by a front door opening. The vehicle 12 may include additional pillars 22, e.g., C-pillars, D-pillars. The pillars 22 may extend from the roof to a floor. FIGS. 1, 2A, and 3A show an A-pillar on a right side of the vehicle 12.

The body defines a passenger compartment to house occupants, if any, of the vehicle. The passenger compartment includes a front end and a rear end with the front end being in front of the rear end during forward movement of the vehicle. The pillars 22, specifically the A-pillars, are at the front end of the passenger compartment.

The trim panel assembly 10 includes the pillar trim panel 14, as shown in FIGS. 1-9. The pillar trim panel 14 covers the pillar 22, specifically, the A-pillar. The trim panel assembly 10 is in the passenger compartment. For example, the pillar trim panel 14 may present a class-A surface that faces the passenger compartment. The pillar trim panel 14 can be, e.g., plastic, a polymer composite, etc. During the vehicle impact, the occupant may move toward the pillar trim panel 14.

The trim panel assembly 10 includes the grab handle 16, as shown in FIGS. 1-6, 8. The grab handle 16 is in the passenger compartment. The occupant may grasp the grab handle 16 for, e.g., support during ingress and egress of the vehicle 12. That is, as the occupant enters the vehicle 12, the occupant may grasp the grab handle 16 to slow descent of the occupant into a vehicle seat. As the occupant exits the vehicle 12, the occupant may pull on the grab handle 16 during ascent from the vehicle seat. To support the occupant, the grab handle 16 may be stiff relative to other interior components in the vehicle 12, e.g., stiffer than the pillar trim panel 14, to support the weight of the occupant. During the vehicle impact, the occupant may move toward the grab handle 16.

The grab handle 16 extends from the pillar trim panel 14. The grab handle 16 extends toward the occupant, placing the grab handle 16 within reach of the occupant. The grab handle 16 may be positioned on the pillar trim panel 14 to be within reach of the occupant raising an arm to graph the grab handle 16. Specifically, the grab handle 16 protrudes from the pillar trim panel 14 into the passenger compartment, e.g., cross-vehicle and/or downwardly.

The grab handle 16 and the pillar trim panel 14 may be unitary. Unitary means a single, uniform piece of material with no seams, joints, fasteners, or adhesives holding it together, i.e., formed together simultaneously as a single continuous unit, e.g., by molding, machining from a unitary blank, etc. Non-unitary components, in contrast, are formed separately and subsequently assembled, e.g., by fastener, welding, adhesive, etc. As another example, the grab handle 16 and the pillar trim panel 14 may be separate components that are joined by, e.g., a weld, a fastener, an adhesive, etc.

The grab handle 16 and the pillar trim panel 14 define the corner 18, as shown in FIGS. 1-6A, 7A, 8A, 9A. The grab handle 16 and the pillar trim panel 14 meet at the corner 18. Specifically, the grab handle 16 and the pillar trim panel 14 intersect at an angle at the corner 18. During the vehicle impact, the occupant's head may move toward the corner 18.

The trim panel assembly 10 includes the ramp 20a, 20b, 20c, 20d, 20e, 20f, 20g, 20h, 20i, collectively, the "ramp" 20. That is, FIGS. 1-9B illustrate nine embodiments of the ramp 20, and the numeral "20" without a letter refers to common features of all ramps 20a-20i. The ramp 20 may control kinematics of the occupant's head moving toward the corner 18 between the pillar trim panel 14 and the grab handle 16. That is, as the occupant's head moves toward the corner 18 during the vehicle impact, the ramp 20 may deflect and/or absorb energy from the occupant.

The ramp 20 is deformable relative to the grab handle 16. That is, to control the kinematics of the occupant's head during the vehicle impact, the ramp 20 may deform, absorbing energy from the occupant. Deforming to absorb energy from the occupant may reduce movement of the occupant's head during the vehicle impact. The ramp 20 may be a suitable material that is deformable relative to the grab handle 16, e.g., plastic, a plastic composite, etc. The ramp 20 is deformable relative to the grab handle 16, for example, by being of a different material than the grab handle 16 (e.g., a material having less stiffness by be more flexible, more brittle, etc.), a different wall thickness than the grab handle 16, and/or geometry of the ramp 20 and/or grab handle 16 that encourages deformation of the ramp 20 relative to the grab handle 16.

Figures 5A, 5B:
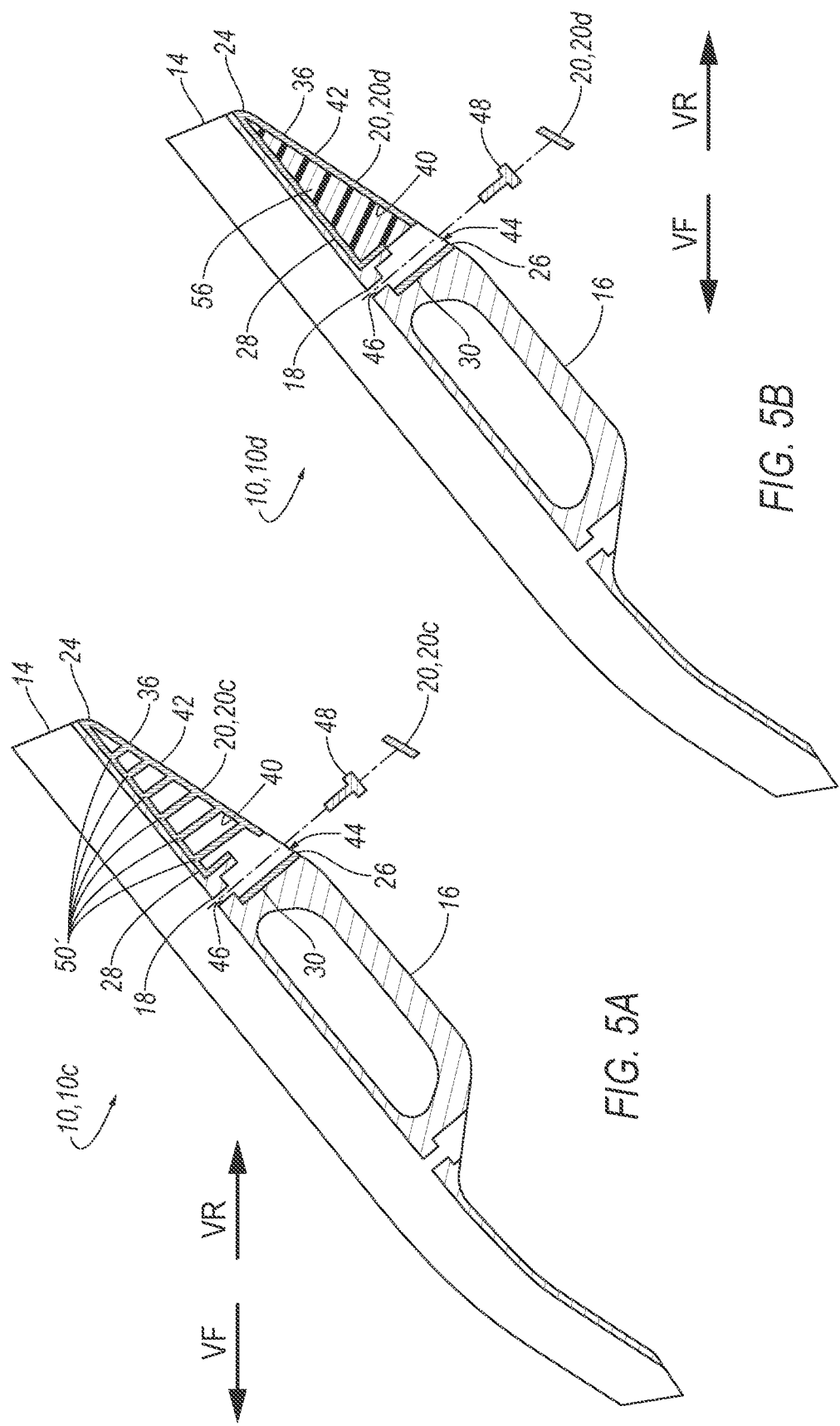
FIG. 5A is a cross-sectional view of a third embodiment of the ramp with ribs.
FIG. 5B is a cross-sectional view of a fourth embodiment of the ramp with a filler block.
Figure 5C:
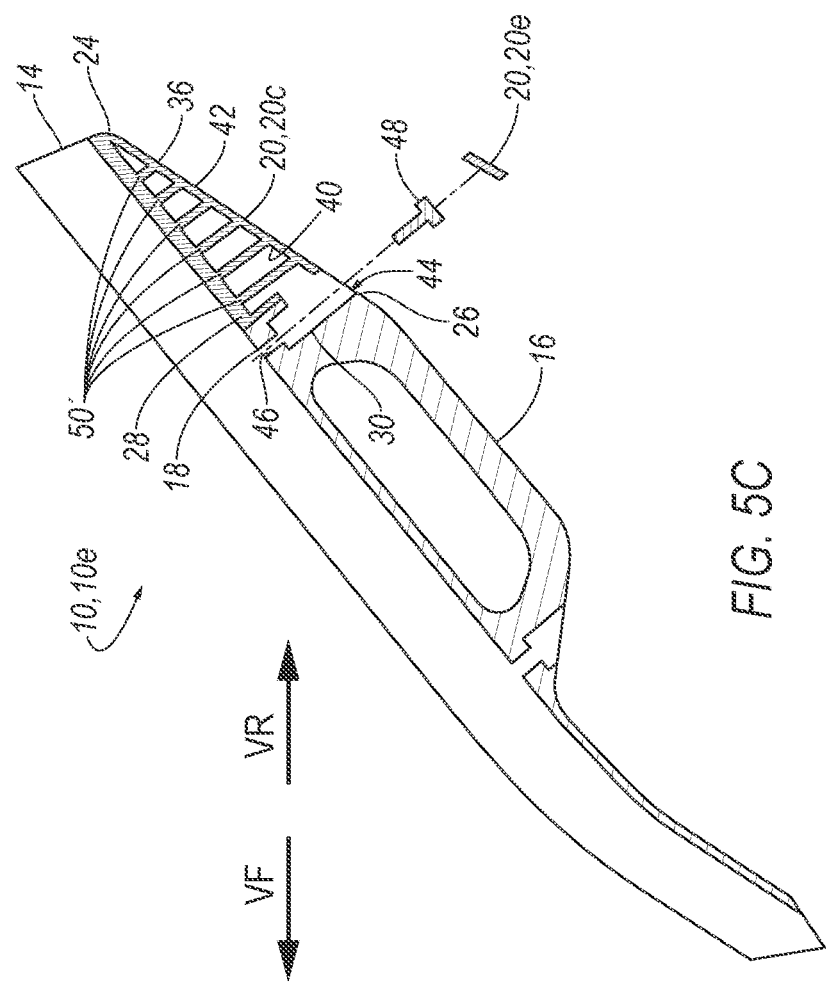
FIG. 5C is a cross-sectional view of a fifth embodiment of the ramp unitary with a trim panel.
Figure 6A:
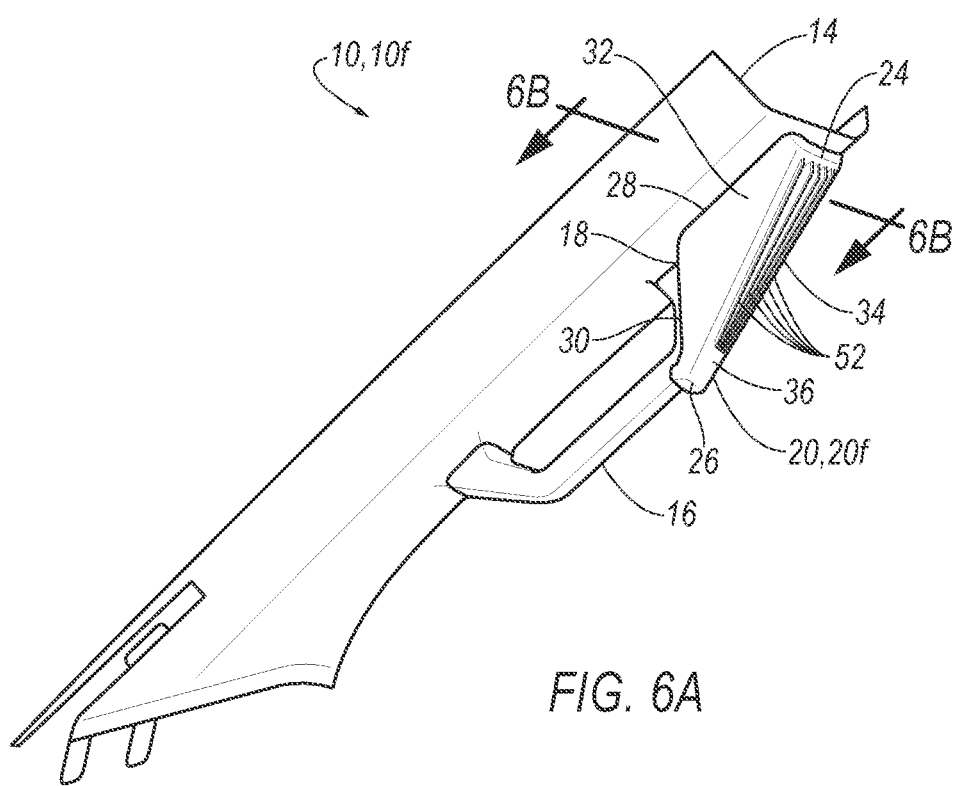
FIG. 6A is a perspective view of a sixth embodiment of the trim panel assembly.
Figure 6B:
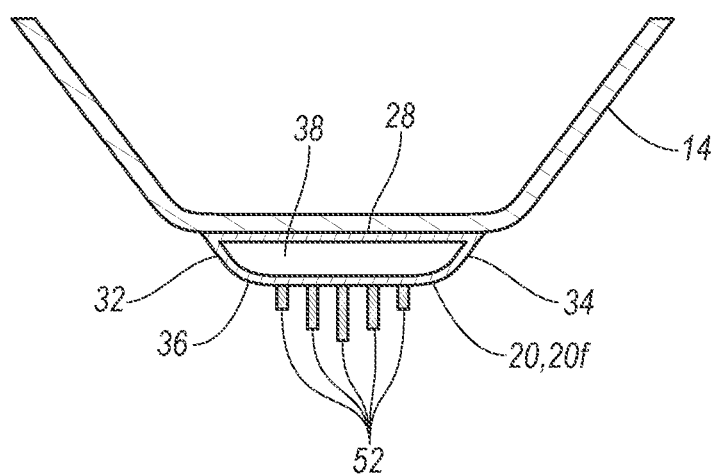
FIG. 6B is a cross-sectional view of the sixth embodiment of the trim panel assembly.
Figure 7A:
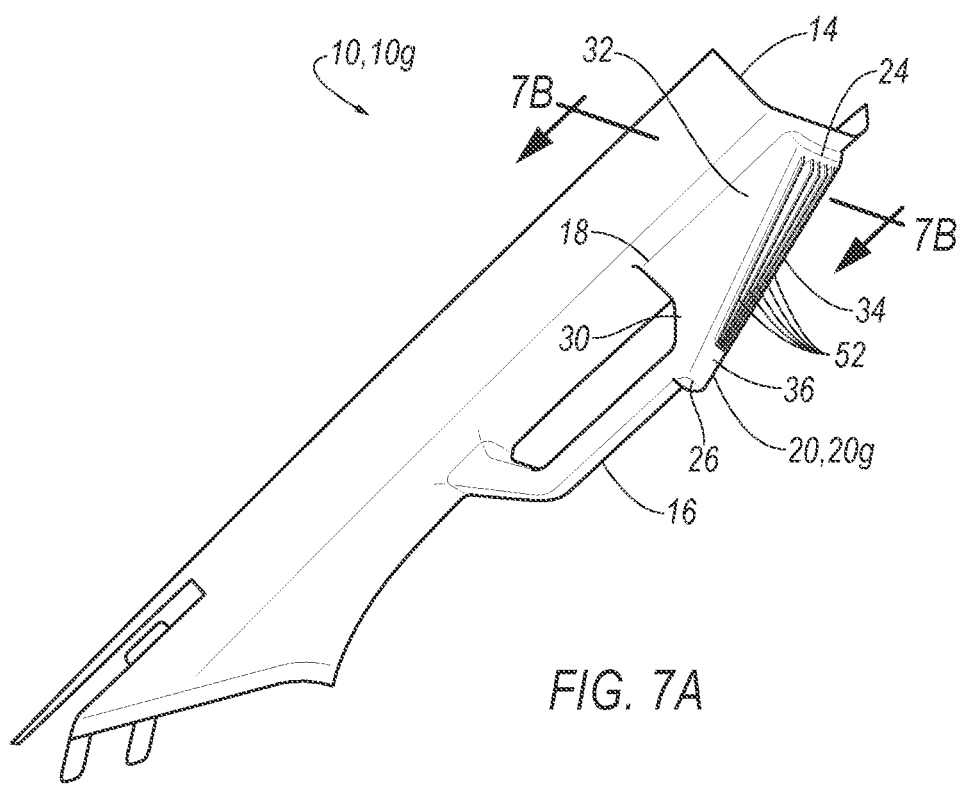
FIG. 7A is a perspective view of a seventh embodiment of the trim panel assembly.
Figure 7B:
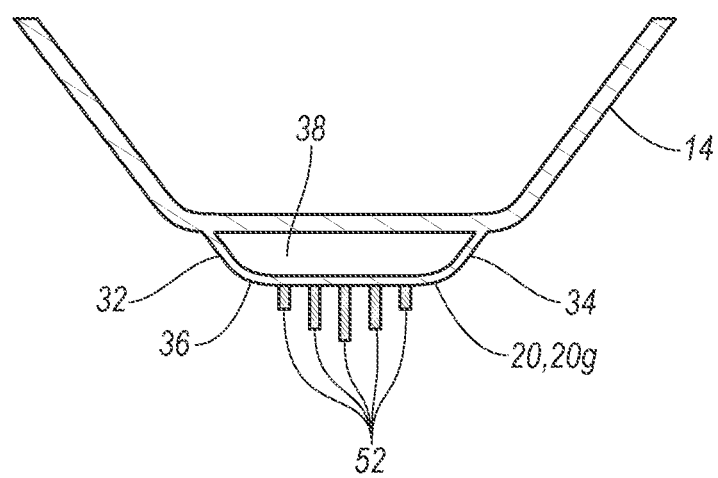
FIG. 7B is a cross-sectional view of the seventh embodiment of the trim panel assembly.
Figure 8A:
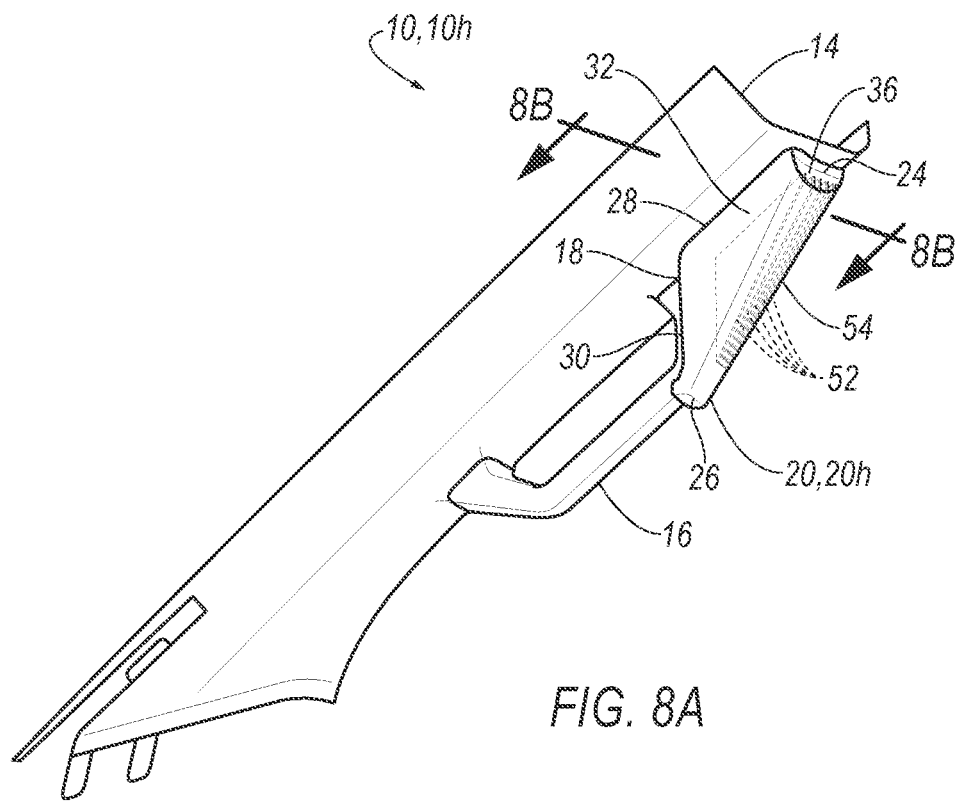
FIG. 8A is a perspective view of an eighth embodiment of the trim panel assembly.
Figure 8B:
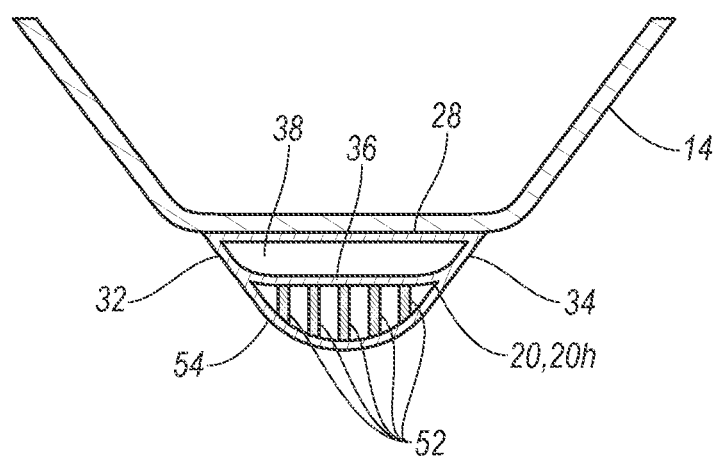
FIG. 8B is a cross-sectional view of the eighth embodiment of the trim panel assembly.

The ramp 20 may be unitary with the pillar trim panel 14 and the grab handle 16, as shown in FIGS. 5C, 7A-7B, and 9A-9B. The pillar trim panel 14, the grab handle 16, and the ramp 20 may be a single piece of material with no seams, joints, fasteners, or adhesives holding it together, i.e., formed together simultaneously as a single continuous unit, e.g., by molding, machining from a unitary blank, etc. The ramp 20e may be unitary with the pillar trim panel 14 and the grab handle 16, as shown in FIG. 5C. The ramp 20g may be unitary with the pillar trim panel 14 and the grab handle 16, as shown in FIGS. 7A-7B. The ramp 20i may be unitary with the pillar trim panel 14 and the grab handle 16, as shown in FIGS. 9A-9B. The pillar trim panel 14, the grab handle 16, and the ramp 20 may be unitary to simply manufacturing of the trim panel assembly 10 and to reduce a number of fasteners in the trim panel assembly 10.

The ramp 20 is designed to deflect the head of an occupant that impacts the ramp 20 during a vehicle impact that urges the head of the occupant toward the ramp 20, e.g., an oblique vehicle impact. Specifically, the ramp 20 occupies the corner 18. Accordingly, the ramp 20 encourages the head of the occupant to slide over the grab handle 16 by minimizing engagement of the head with the corner 18.

The ramp 20 is disposed at the corner 18, as shown in FIGS. 1-6A, 7A, 8A, 9A. The ramp 20 is fixed relative to the pillar trim panel 14 and the grab handle 16 at the corner 18. The ramp 20 may include a first end 24 disposed at the pillar trim panel 14 and a second end 26 disposed at the grab handle 16. The first end 24 of the ramp 20 may be disposed above the grab handle 16. To receive the occupant, the first end 24 of the ramp 20 may be vehicle-rearward VR of the second end 26. In such an example, at the corner 18, the grab handle 16 may be below a portion of the pillar trim panel 14. When the grab handle 16 is disposed on the A-pillar, the grab handle 16 is vehicle-forward VF of the pillar trim panel 14, and because the A-pillar slopes downward in the vehicle-forward direction VF, the first end 24 of the ramp 20 is above the grab handle 16. Thus, the first end 24 of the ramp 20 disposed at the pillar trim panel 14 is vehicle-rearward VR of the second end 26 of the ramp 20 disposed at the grab handle 16. The ramp 20 thus provides a gradually descending surface from the grab handle 16 to the pillar trim panel 14.

The ramp 20 has four sides 28, 30, 32, 34 and a bottom 36, as shown in FIGS. 1-9B. A first side 28 of the ramp 20 may face the pillar trim panel 14. A second side 30 of the ramp 20 may face the grab handle 16. The first and second sides 28, 30 may abut the grab handle 16 and the pillar trim panel 14 at the corner 18. The first and second sides 28, 30 may be arranged along the angle defined by the corner 18 leaving substantially no space between the first and second sides 28, 30, the pillar trim panel 14, and the grab handle 16. Thus, the first and second sides 28, 30 may transfer energy from the occupant to the pillar trim panel 14 and the grab handle 16.

A third side 32 of the ramp 20 may face in a vehicle-inward direction. That is, the third side 32 may face toward the occupant. During the vehicle impact, the third side 32 may receive the occupant and absorb energy from the occupant. The third side 32 may extend from the first side 28 to the second side 30. A fourth side 34 of the ramp 20 may face in a vehicle-outward direction. That is, the fourth side 34 may face away from the occupant. During the vehicle impact, the fourth side 34 may receive energy from the occupant after the first, second, and third sides 28, 30, 32. The fourth side 34 may enclose the first second and third sides 28, 30, 32 to form a pyramidal shape. The fourth side 34 may extend from the first side 28 to the second side 30.

A bottom 36 of the ramp 20 may face the occupant. The bottom 30 extends from the third side 32 to the fourth side 34. The bottom 36 provides a base for the pyramidal shape of the ramp 20. The bottom 36 faces the interior of the passenger cabin. During the vehicle impact, the bottom 36 receives the occupant, absorbing energy from the occupant. The bottom 36 may be angled to gradually slope between the grab handle 16 and the pillar trim panel 14. The bottom 36 may be a substantially flat surface that extends from the first end 24 of the ramp 20 to the second end 26 of the ramp 20. Thus, the bottom 36 covers the angle defined by the corner 18 between the pillar trim panel 14 and the grab handle 16.

The ramp 20 may define a cavity 38, i.e., a void, as shown in FIGS. 2B, 3B, 5A-5B, 7, 9. Specifically, the sides 28, 30, 32, 34 and the bottom 36 may define the cavity 38 therebetween. The cavity 38 allows the ramp 20 to deform upon receiving the occupant. For example, the cavity 38 may be empty as shown in the ramp 20a in FIG. 2B, and the deformation strength of the portion of the ramp 20 that receives the occupant's head may be lower than the deformation strength of the grab handle 16. The portion of the ramp 20 that receives the occupant's head may deform into the cavity 38, absorbing energy from the occupant. The cavity 38 may be enclosed by the ramp 20.

The ramp 20 may include an inner surface 40 and an outer surface 42, as shown in FIGS. 2B, 3B, 5A-5C. The inner surface 40 may face the cavity 38, the pillar trim panel 14, and the grab handle 16. The outer surface 42 may face in an opposite direction than the inner surface 40. That is, the outer surface 42 may face into the passenger cabin of the vehicle 12 toward the occupant. During the vehicle impact, the occupant may contact the outer surface 42 of the ramp 20, deforming the outer surface 42 toward the corner 18 and absorbing energy from the occupant.

The ramp 20c, 20d, 20e of the vehicle trim pillar assembly 10c, 10d, 10e may include a hole 44 that is aligned with a second hole 46 of the grab handle 16, as shown in FIGS. 4B-5C. The hole 44 of the ramp 20 may be at the first end 24 of the ramp 20 between the cavity 38 and the grab handle 16. The hole 44 of the ramp 20 may receive a fastener 48 that extends through the hole 44 in the ramp 20 and the second hole 46 in the grab handle 16. The fastener 48 may connect the ramp 20 to the grab handle 16. Fastening the ramp 20 to the grab handle 16 allows the ramp 20 and the grab handle 16 to be formed separately and connected later. The ramp 20 may be designed to provide specified energy absorption characteristics for a specific vehicle 12 and then fastened to the grab handle 16. The fastener 48 may be any suitable type, e.g., a bolt, a screw, a pin, etc.

Figure 3B:
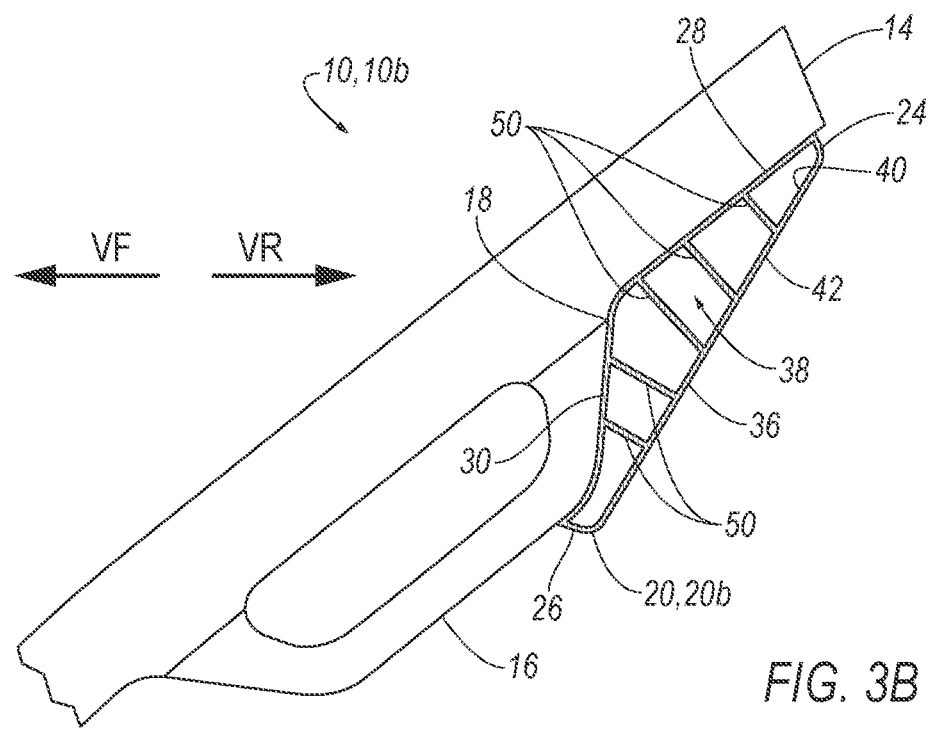
FIG. 3B is a cross-sectional view of a second embodiment of the ramp.

The ramp 20b, 20c, 20e of the vehicle trim pillar assembly 10b, 10c, 10e may include one or more ribs 50, 50', as shown in FIGS. 3B, 5A, 5C. That is, the numeral 50 refers to the ribs shown in FIG. 3B for the ramp 20b, and the numeral 50' refers to the ribs shown in FIG. 5A for the ramp 20c and FIG. 5C for the ramp 20e. The ribs 50, 50' are elongated along a longitudinal axis of the ramp 20b, 20c, 20e. The ribs 50, 50' may absorb energy from the occupant during the impact. Specifically, the ribs 50, 50' may deform during the impact as the outer surface 42 of the ramp 20 deforms, absorbing energy from the occupant. The ribs 50, 50' may be sized to absorb energy from the occupant in a specified manner. For example, at least one of the ribs 50, 50' may be sized to define respective gaps with other ribs 50, 50', and when the ribs 50, 50' absorb energy from the occupant, the ribs 50, 50' may deform toward the corner 18 and may flex laterally. Thus, the ramp 20 may be designed to provide specified energy absorbing characteristics.

The ribs 50, 50' may be disposed in the cavity 38, as shown in FIGS. 3B, 5A, 5C. The ribs 50, 50' may extend from the inner surface 40 to the surface of the ramp 20 at the corner 18. That is, as the outer surface 42 of the ramp 20 receives the occupant, the ribs 50 may absorb energy from the occupant through the inner surface 40, deforming toward the corner 18. The ribs 50, 50' thus can distribute energy absorbed from the occupant, allowing portions of the ramp 20 that may not receive the occupant to absorb energy from the occupant. The distribution of the energy absorption by the ribs 50, 50' may provide specific energy absorbing characteristics of the ramp 20.

The ramp 20f, 20g, 20h, 20i of the vehicle trim pillar assembly 10f, 10g, 10h, 10i may include an external rib 52, as shown in FIGS. 6A-9B. The external rib 52 may be disposed on the outer surface 42 of the ramp 20. The external rib 52 may absorb energy from the occupant during the vehicle impact. Specifically, the external rib 52 may receive the occupant before the outer surface 42 receives the occupant, and the external rib 52 may deform before the outer surface 42 begins to deform. Thus, the external rib 52 may absorb energy from the occupant before the outer surface 42 absorbs energy from the occupant. Because the external rib 52 and the outer surface 42 present to the occupant, the outer surface 42 and the external rib 52 are class-A surfaces, as described above. The external rib 52 may be elongated in a direction from the first end 24 to the second end 26. Because the external rib 52 extends from the first end 24 to the second end 26, the external rib 52 may deform toward the outer surface 42 of the ramp 20 and flex laterally when the external rib 52 receives the impact. The deformation and flexing of the external rib 52 absorbs energy from the occupant that would otherwise be absorbed by the outer surface 42 of the ramp 20 and transmitted to the pillar trim panel 14 and the grab handle 16. As shown in FIGS. 6-9, the ramp 20 may include a plurality of external ribs 52.

The ramp 20h, 20i may include a cover 54 extending across the external ribs 52, as shown in FIGS. 8A-9B. The cover 54 absorbs energy from the occupant and distributes the energy to the external ribs 52. That is, distributing the energy from the occupant from the cover 54 to the external ribs 52 allows one or more of the external ribs 52 that may not contact the occupant to absorb energy from the occupant. Thus, the ramp 20 can utilize the deformation strength of all of the external ribs 52 to absorb energy from the occupant. The cover 54 may be a class-A surface. The cover 54 may be unitary with the third side 32 and the fourth side 34 of the ramp 20h, 20i. Alternatively, the cover 54 may be formed separately and affixed to the third side 32 and the fourth side 34 later, e.g., with a fastener, welding, an adhesive, etc.

The ramp 20d may include a filler block 56, as shown in FIG. 5B. The filler block 56 is disposed in the cavity 38 and absorbs energy from impact of the head of the occupant with the ramp 20d. Specifically, when the outer surface 42 receives the occupant during the vehicle impact, the filler block 56 deforms and absorbs energy from the occupant. In such examples, the filler block 56 in the ramp 20 provides energy absorption of the occupant during the vehicle impact.

The filler block 56 may be a different material type than a material type of the ramp 20, e.g., a polymer foam. The material type of the filler block 56 may be stiffer than the material type of the ramp 20, e.g., the material type of the filler block 56 may deform more easily than the material type of the ramp 20. As another example, the filler block 56 may have a shape that absorbs energy differently from the outer surface 42 during the vehicle impact. In such an example, the material type of the filler block 56 may be the same as or different than the material type of the ramp 20. For example, the filler block 56 may be a polymer matrix that includes a plurality of voids, and the filler block 56 may have a lower deformation strength than the outer surface 42 of the ramp 20.

The filler block 56 may fill the entire cavity 38, i.e., the filler block 56 may extend throughout the volume defined by the cavity 38. In such an example, the filler block 56 receives the impact from the outer surface 42 of the ramp 20 without structure or space therebetween, absorbing energy from the impact as the occupant engages the ramp 20. Alternatively, the filler block 56 may extend through a volume of the cavity 38 smaller than the entire volume of the cavity 38. That is, the filler block 56 may be a suitable size to control kinematics of the occupant during the vehicle impact.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle trim panel assembly, comprising:
a pillar trim panel;
a grab handle extending from the pillar trim panel defining a corner between the pillar trim panel and the grab handle; and
a ramp at the corner, the ramp being fixed relative to the pillar trim panel and the grab handle at the corner, and the ramp being deformable relative to the grab handle;
the ramp including a first end at the trim panel and a second end at the grab handle, the first end of the ramp being above the handle.

2. The vehicle trim panel assembly of claim 1, wherein the ramp includes a cavity facing the pillar trim panel and the grab handle.

3. The vehicle trim panel assembly of claim 2, wherein the ramp includes ribs in the cavity.

4. The vehicle trim panel assembly of claim 2, further comprising a filler block in the cavity, the filler block being a different material type than the material type of the ramp.

5. The vehicle trim panel assembly of claim 4, wherein the filler block is foam.

6. The vehicle trim panel assembly of claim 5, wherein the ramp is plastic.

7. The vehicle trim panel assembly of claim 2, wherein the cavity is enclosed by the ramp, the pillar trim panel, and the grab handle.

8. The vehicle trim panel assembly of claim 1, wherein the ramp includes an inner surface facing the trim panel and the grab handle and an outer surface facing an opposite direction than the inner surface, the ramp including an external rib on the outer surface.

9. The vehicle trim panel assembly of claim 8, wherein the external rib is elongated in a direction from the first end to the second end.

10. The vehicle trim panel assembly of claim 8, wherein the outer surface and the external rib are class-A surfaces.

11. The vehicle trim panel assembly of claim 1, wherein the grab handle includes a hole, the ramp includes a hole aligned with the hole of the grab handle, and a fastener extends through the hole in the ramp and the hole in the grab handle connecting the ramp to the grab handle.

12. The vehicle trim panel assembly of claim 11, wherein the ramp includes a cavity facing the pillar trim panel and the grab handle, the hole of the ramp being between the cavity and the grab handle.

13. The vehicle trim panel assembly of claim 12, wherein the ramp includes ribs in the cavity.

14. The vehicle trim panel assembly of claim 12, further comprising a filler block in the cavity, the filler block being a different material type than the material type of the ramp.

15. The vehicle trim panel assembly of claim 1, wherein the first end of the ramp is vehicle-rearward of the second end.

16. The vehicle trim panel assembly of claim 15, wherein the grab handle includes a hole, the ramp includes a hole at the first end of the ramp, and a fastener extends through the hole in the ramp and the hole in the grab handle and connecting the ramp to the grab handle.

17. The vehicle trim panel assembly of claim 1, further comprising a fastener connecting the ramp to the grab handle.

18. A vehicle trim panel assembly, comprising:

a pillar trim panel;

a grab handle extending from the pillar trim panel defining a corner between the pillar trim panel and the grab handle; and a ramp at the corner, the ramp being fixed relative to the pillar trim panel and the grab handle at the corner, and the ramp being deformable relative to the grab handle;

the ramp includes a cavity facing the pillar trim panel and the grab handle.

19. The vehicle trim panel assembly of claim 18, wherein the cavity is enclosed by the ramp, the pillar trim panel, and the grab handle.

20. A vehicle trim panel assembly, comprising:

a pillar trim panel;

a grab handle extending from the pillar trim panel defining a corner between the pillar trim panel and the grab handle; and a ramp at the corner, the ramp being fixed relative to the pillar trim panel and the grab handle at the corner, and the ramp being deformable relative to the grab handle;

the ramp including an inner surface facing the trim panel and the grab handle and an outer surface facing an opposite direction than the inner surface, the ramp including an external rib on the outer surface.

\* \* \* \* \*